(12) United States Patent
Jodlauk et al.

(10) Patent No.: US 8,504,075 B2
(45) Date of Patent: Aug. 6, 2013

(54) SYSTEM, METHOD AND APPARATUSES FOR PROVIDING A FILTERED LOCALIZED INFORMATION SERVICE

(75) Inventors: Gordian Jodlauk, Würselen (DE); Guido Gehlen, Neuss (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/391,802

(22) PCT Filed: Aug. 25, 2009

(86) PCT No.: PCT/EP2009/060917
§ 371 (c)(1),
(2), (4) Date: May 7, 2012

(87) PCT Pub. No.: WO2011/023222
PCT Pub. Date: Mar. 3, 2011

(65) Prior Publication Data
US 2012/0214478 A1    Aug. 23, 2012

(51) Int. Cl.
*H04W 24/00*    (2009.01)
*H04W 4/00*    (2009.01)

(52) U.S. Cl.
USPC .................................. 455/456.3; 455/422.1

(58) Field of Classification Search
USPC ............................................ 455/456.3, 422.1
See application file for complete search history.

(56) References Cited

U.S. PATENT DOCUMENTS

| 6,115,605 A | 9/2000 | Siccardo et al. |
| 2004/0203575 A1 | 10/2004 | Chin et al. |

FOREIGN PATENT DOCUMENTS

| EP | 1 876 807 A1 | 1/2008 |
| EP | 1 944 991 A1 | 7/2008 |

*Primary Examiner* — Temica M Beamer
*Assistant Examiner* — Joel Ajayi
(74) *Attorney, Agent, or Firm* — Coats & Bennett, P.L.L.C.

(57) ABSTRACT

A system for providing a localized information service using an infrastructure of a cellular communication network, the system comprising at least one service source terminal arranged for transmitting a network upload message to the cellular communication network, said network upload message comprising a payload part, a reflection entity of said cellular communication network arranged for receiving said network upload message, for generating one or more reflection messages comprising said payload part, and for sending said reflection messages to a group of service destination terminals that have a predetermined spatial relationship with said service source terminal, and a filter arranged for blocking a further network upload message that has a predetermined context relationship with said network upload message from being sent to the group of service destination terminals.

19 Claims, 5 Drawing Sheets

SYSTEM, METHOD AND APPARATUSES FOR PROVIDING A FILTERED LOCALIZED INFORMATION SERVICE

TECHNICAL FIELD

The present invention relates to a system for providing a localized information service using an infrastructure of a cellular communication network, to a method for operating a system that provides a localized information service using an infrastructure of a cellular communication network, to a network entity of a cellular communication network, and to a method of controlling such a network entity.

BACKGROUND

It is known to provide so-called Location Based Services (LBS) in cellular communication networks, such as cellular wireless telephone networks. Such services typically comprise mechanisms for estimating the location of a terminal, e.g. with the help of a Global Positioning System (GPS) or a Mobile Positioning System (MPS) that may use Cell-ID information or algorithms based on timing advances and for a triangulation for determining the position of a terminal. Based on the knowledge of the terminal's location, specific location based services can be offered to said terminal, e.g. alert messages for upcoming road traffic hazards or indications toward deviations to circumvent traffic jams.

It is furthermore known to broadcast information with the help of so-called Cell Broadcast Services (CBS), in order to distribute information to terminals within one or more cells. The respective terminals have to enable the listening of the respective broadcast channel. A so-called Multimedia Broadcast and Multi-Cast Service (MBMS) is known that provides a broadband broadcast to mobile terminals. On an application layer, a file transmission using e.g. FLUTE (File Delivery over Unidirectional Transport) or a streaming transmission using RTP (Real Time Transport Protocol) may be used to transmit content to terminals.

Furthermore, emergency services are known, in which upon receiving an emergency message from a mobile terminal, a determination of the location of said terminal is made, in order to e.g. be able to send help to that location, for example in the form of an ambulance.

SUMMARY

The object of the present invention is to provide an improved location based service using an infrastructure of a cellular communication network, such as a cellular wireless telephone network. In particular, it is an object of the present invention to provide an efficient distribution of information as part of a location based service that substantially reduces redundancies in message distribution and substantially reduces network load.

This object is achieved by the subject-matter of the independent claims. Preferred embodiments are described in the dependent claims.

According to an embodiment of the invention, a system is proposed for providing a localized information service using an infrastructure of a cellular communication network, the system comprising at least one service source terminal arranged for transmitting a network upload message to the cellular communication network, said network upload message comprising a payload part, a reflection entity of said cellular communication network arranged for receiving said network upload message, for generating one or more reflection messages comprising said payload part, and for sending said reflection messages to a group of service destination terminals that have a predetermined spatial relationship with said service source terminal, and a filter arranged for blocking a further network upload message that has a predetermined context relationship with said network upload message from being sent to the group of service destination terminals.

Thus, a fast and efficient concept of data reflection is provided by the present invention. Namely, a source terminal sends specific content in a payload part of a network upload message. The network upload message is a message that does not contain destination addresses of other terminals (such as e.g. would be the case in an SMS or MMS). The network upload message is, however, arranged such that it can be recognized as such, i.e. as a message for being reflected, for example by carrying or lacking a predetermined piece of information.

Within the network a reflection entity is provided which is arranged for recognizing the network upload message. The reflection entity "reflects" the content in the payload part by simply placing it into messages that are destined for a group of service destination terminals or, more generally, for at least one service destination terminal that has a predetermined spatial relationship with the terminal that sent the upload network message (the service source terminal).

The predetermined spatial relationship can be determined explicitly by the reflection entity, e.g. by determining the location of the service source terminal that transmitted the network upload message and then determining destination terminals that, e.g. are within a predetermined distance of said service source terminal, or the spatial relationship can be established implicitly, e.g. by virtue of the position of the reflection entity itself, which can for example be associated with a network base station and arranged for sending the reflection message to all terminals with the coverage area of said base station.

In other words, the concept of data reflection renders it possible to distribute information to a spatially restricted number of terminals while requiring only very little processing resources, because the content in the payload part is merely reflected. In this way, a localized information service can be provided in which certain service source terminals (which can preferably also at the same time act as service destination terminals) can trigger an information flow by sending an upload message which is then promptly reflected by the reflection entity to a spatially limited group of service destination terminals.

Further, a filter is provided that is arranged for blocking a further network upload message that has a predetermined context relationship with the network upload message from being sent to the group of service destination terminals. In this way, the system avoids redundant and/or repeated sending of related information to the group of service destination terminals, and, hence, substantially improves system efficiency and substantially reduces load to all involved radio and processing resources of the cellular communication network. Also, in case a terminal is about to transmit a network upload message, but receives a reflection message with the same predetermined context relationship beforehand, the terminal itself may block the new network upload message from being transmitted, which would further reduce uplink network load.

Said further network upload message may be any upload message being received from any service source terminal, i.e. the service source terminal that has already sent the initial network upload message or any other service source terminal. In principle, this may originate from the fact that one single service source terminal remains for some finite time in a situation, in which sending of a network upload message is repeatedly triggered. Also, more than one service source terminal may find itself in one identical situation or in situations that are related to each other, in which sending of a respective network upload message by each service source terminal is independently triggered.

Examples for such situations include a traffic jam, in which a plurality of vehicles is involved and, as a consequence, each traffic member may detect the "same" traffic jam and respective service source terminals of the traffic members transmit each at least one network upload message. Such a traffic jam may also persist for a longer time, such that one single vehicle may detect again and again the "same" traffic jam, which may also result in transmitting repeatedly respective network upload messages that, however, relate to one single event and, hence, have a predetermined context relationship with each other.

In case incoming network upload messages are simply reflected by a network, for example as in the above scenario, redundant reflection of information takes place, since one single message may suffice to inform and/or warn other involved service destination terminals about the specific event. Simple reflection, thus, can also result in an overload situation of the cellular communications network, or at least of parts thereof, since radio and/or processing resources may quickly exhaust once a plurality of service source and/or destination terminals are involved.

The predetermined context relationship between the network upload message and the further network upload message may be determined in various ways. For example, the predetermined context relationship between two respective network upload messages may specify that reflecting both network upload messages to the group of service destination terminals would result in a redundant transmission or distribution of information. As a consequence, defining the predetermined context relationship and filtering received network upload messages accordingly helps to avoid wasting or exhausting radio and processing resources of the cellular communication network.

It is noted that a simple example of two respective network upload messages having a predetermined context relationship is the case of both network upload messages being identical. In this way, the filter could easily determine that sending the further network upload message would result in redundant transmission of information, which, according to the present invention, can be avoided in order to improve system efficiency.

However, the predetermined context relationship between two respective network upload messages can well also lie in a more subtle relationship. In this way, two respective network upload messages that are completely different from each other may, however, have a predetermined context relationship as understood by the present invention. The filter may, therefore, also comprise more or less elaborate means for determining such a predetermined context relationship between two respective network upload messages. These means may further be able to analyze the respective network upload messages or the content thereof (such as the payload part) for generating content information of the network upload messages on a more abstract level. Such abstract content information may then be available in a form in which it is comparable to each other in order to determine whether the respective network upload messages have a predetermined context relationship.

Nevertheless, there is a broad variety of determination criteria and/or message properties that can be used for the determination of a predetermined context relationship between two respective messages. Exemplary criteria include message sending times, message originating locations that may coincide with the locations of the respective service source terminals that have transmitted the network upload messages, and/or message type identifiers that specify events or event classes that have triggered the transmitting of the respective network upload message by the service source terminal.

By means of the above criteria, the determination of a predetermined context relationship between two network upload messages may be determined by comparing the respective sending times, sending locations or message type identifiers and determining whether the respective values coincide or lie within a predetermined tolerance range with each other. As an example, it may be determined that two network upload messages have a predetermined context relationship if the two respective messages have been transmitted by two service source terminals that are located close to another, for example in the vicinity of a few hundred meters, and the messages have been sent within a time window of, for example, one minute or less. As a further example, two network upload messages that have been transmitted from the same cell within a time span of one minute both carry the message type identifier "ACCIDENT". These two messages could then be clearly put into a predetermined context relationship as understood by the present invention. In general, however, the predetermined context relationship may be characterized in any spatial and/or temporal coincidence of two respective network upload messages. Further, the predetermined context relationship could also be used for network validation and/or fraud protection.

A further possibility lies in defining so-called context zones, such as spatial and/or time zones that determine a context relationship of two respective network upload messages once both messages originate from the zone. Such a context zone may be statically defined, for example as a road crossing in conjunction with optionally defined peak hours, or may be well also dynamically defined, for example as a zone surrounding the end and trail of a traffic jam. Here, it also becomes clear that such context zones may also vary over time with respect to their spatial extend and position, so that context zones can be well adapted to actual situations, such as, for example, a trail of a traffic jam that gradually moves upstream as more and more vehicles arrive and the jam grows longer.

Further, the predetermined context relationship may also take into account a certain lifetime, or may also be defined as such only for the period of some lifetime. In this way, the context relationship may only be valid for some finite time span, and may, after its expiry, become invalid, such that further network upload messages are reflected unfiltered until a next context relationship is established. The concept of a lifetime can, therefore, also account for situations in which repeated message reflection is redundant but nevertheless valuable. For example, a repeated reflection of related information may indicate the persistence of a certain situation and may inform users about the fact that there will be probably still time required until the event, such as a traffic jam, has resolved. In general, such a lifetime can be inherited from the lifetime of an originating network upload message.

The above-described concept of efficient data reflection can be of particular advantage in case of messages that warn a plurality of service destination terminals that are all located inside a restricted spatial area and, moreover, may both act as a service destination terminal, as well as a service source terminal. Since such terminals may all be affected by the same event, such as a road accident or a traffic jam, more than one terminal may consequently act as a service source terminal and transmit a respective network upload message. At the same time, however, these terminals will also receive the respective reflection messages as service destination terminals due to their respective spatial relationship with the nearby terminals. By simply reflecting all incoming network upload messages to all involved service destination terminals, system load to radio and processing resources of the cellular communication network infrastructure may soon reach unacceptable high levels and may render the quality of other services in the area, such as telephony, low or may render even such service inoperable.

The concept of efficient data reflection can also be of particular advantage in case of messages that warn service destination terminals of time-critical events, such as upcoming road traffic hazards. Such messages are particularly time-critical, since the service destination terminal may be moving fast toward the location of said road traffic hazard, which may coincide with the location of the service source terminal that has sent the network upload message. In such situations, all system inherent delay may result in a substantial loss of usability of data reflection, since every second counts for, e.g., reducing speed in time or still being able to catch an exit in order to circumvent the upcoming road hazard. Road traffic hazards, for example, include traffic jams, trails of traffic jams, incidents, road blocks, localized extreme weather conditions, such as thunderstorms, hailstorms, tornados, or slippery road conditions.

As a consequence, it may be advantageous to keep all involved service terminals in a connected mode of the respective cellular communication network, i.e. to reserve and allocate radio and channel resources of the cellular communication network between the respective service terminals and the reflection entity. This may also include providing a dedicated communication channel for each terminal to allow for message transmission and data reflection in an advantageously fast way. This, however, already poses a substantial load to radio and processing resources of the network in case only a single message has to be reflected to a plurality of service destination terminals. If, now, a plurality of related network upload messages is triggered and reflected unfiltered, load levels may quickly reach maximum capacitance levels of the involved infrastructure and resources.

However, in case all or a part of service destination terminals are affected by the same event that has triggered the transmitting of the respective plurality of network upload messages, filtered reflection may ensure keeping the load at acceptable levels, although allowing for—at the same time—fast data reflection and timely warnings to users on hazardous events that they are about to approach.

In general, the service source terminal and the service destination terminal may be identical or similar units, such as mobile phones, hand-held mobile devices, Personal Digital Assistants (PDA), mobile positioning systems such as hand-held GPS, Glonass, or Galileo devices. They can be, however, also vehicle mounted devices, such as navigation systems, vehicle mounted mobile phones, vehicle mount traffic alert systems, and the like. Further the terminals may comprise modules and/or components according to and/or complying with the Global System of Mobile Communications (GSM), General Packet Radio Service (GPRS), Enhanced Data Rates for GSM Evolution (EDGE), Universal Mobile Telecommunications System (UMTS), High Speed Packet Access (HSPA), 3GPP Long Term Evolution (LTE), Cell-ID transmission, Multimedia Broadcast Multicast Service (MBMS), Location Based Services (LBS). Further, the terminals may comprise a GPS-, Glonass-, or Galileo-module, various sensors to detect hazardous situations such as incidents, traffic jams or extreme weather conditions, display or speaker means for informing users about incoming warnings in form of reflection messages, and/or means for storing a digital map to determine spatial zones. In addition to the above, the service source and/or destination terminal may also be or be part of a vehicle integrated system, such as a so-called eCall (emergency call) device.

According to a further embodiment, a method is proposed for operating a system that provides a localized information service using an infrastructure of a cellular communication network, the system comprising at least one service source terminal arranged for transmitting a network upload message to the cellular communication network, said network upload message comprising a payload part and a reflection entity of said cellular communication network arranged for receiving said network upload message, for generating one or more reflection messages comprising said payload part, and for sending said reflection messages to a group of service destination terminals that have a predetermined spatial relationship with said service source terminal, wherein the method comprises filtering the network upload messages for blocking a further network upload message that has a predetermined context relationship to said network upload message from being sent to the group of service destination terminals.

According to a further embodiment, a network entity of a cellular communication network comprises a receiver for receiving from at least one service source terminal a network upload message comprising a payload part, a message generator for generating one or more reflection messages comprising said payload part, a message sender for sending said one or more reflection messages to a group of service destination terminals that have a predetermined spatial relationship with said service source terminal, and a filter for blocking a further network upload message that has a predetermined context relationship to said network upload message from being sent to the group of service destination terminals.

According to yet another embodiment, a method of controlling such a network entity is provided comprising a procedure for receiving from at least one service source terminal a network upload message comprising a payload part, a procedure for generating one or more reflection messages comprising said payload part, a procedure for sending said one or more reflection messages to a group of service destination terminals that have a predetermined spatial relationship with said service source terminal, and a procedure for blocking a further network upload message that has a predetermined context relationship to said network upload message from being sent to the group of service destination terminals.

BRIEF DESCRIPTION OF THE DRAWINGS

Embodiments of the present invention, which are presented for better understanding the inventive concepts but which are not to be seen as limiting the invention, will now be described with reference to the Figures, in which.

DETAILED DESCRIPTION

Figure 1:
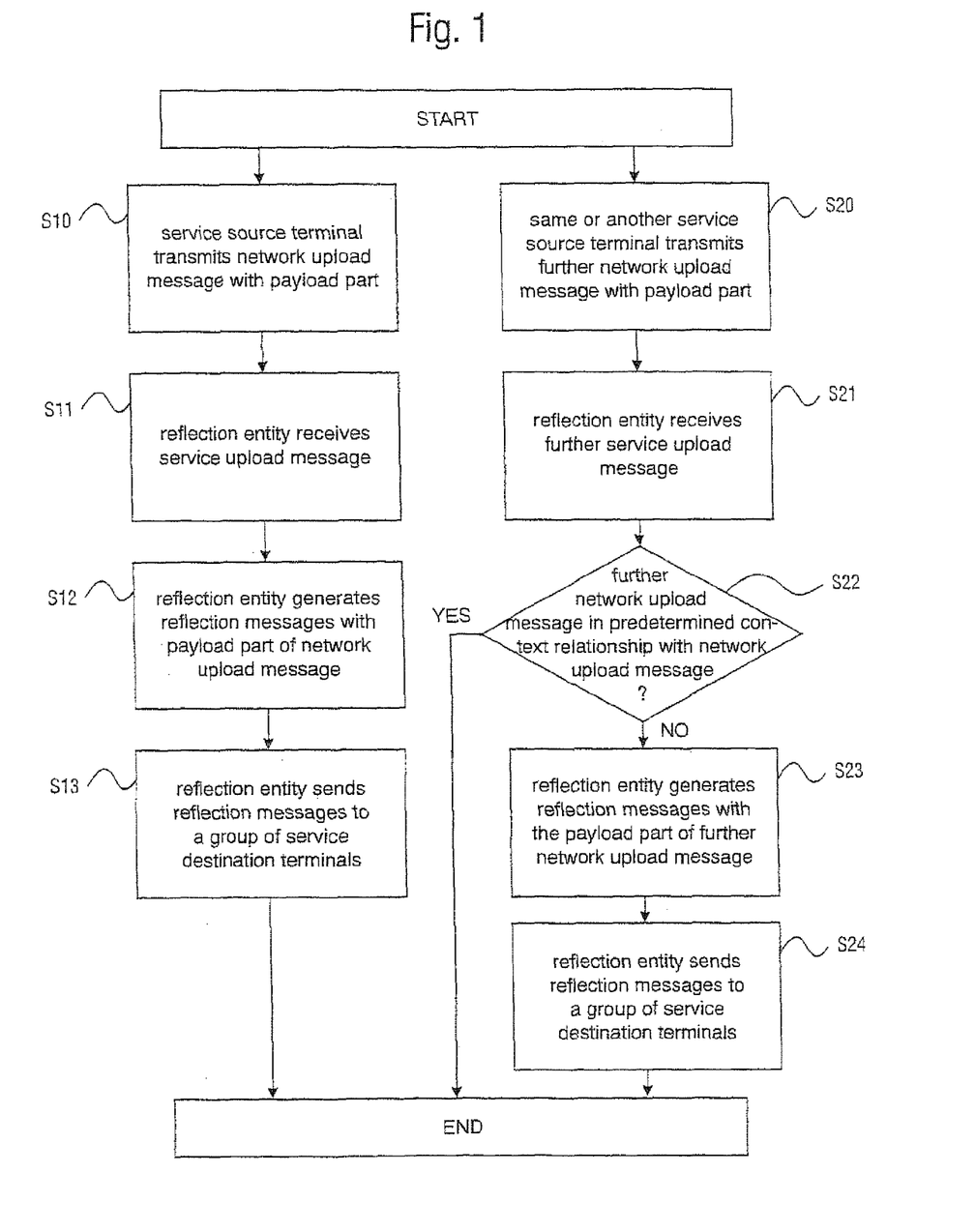
FIG. 1 shows a flowchart of a method embodiment of the present invention.

FIG. 1 shows a flowchart of a basic method embodiment of the present invention. In a first step S10 a terminal of a cellular communication network transmits a network upload message to the cellular communication network, where the upload message comprises certain content in a payload part.

The term "network upload message" means that the message is meant to be uploaded to the cellular communication network, but it also means that this is a specific message designed for the localized information service in that it comprises a suitable form of indicator, such that the cellular communication network can recognise it as being a message comprising a payload part that is to be reflected back to service destination terminals in a localized information service. The indicator can be chosen in any suitable or desirable way, e.g. it can be a predetermined string of data such as a server address, or it can be some other indicator, such as a flag in the header of the message.

The triggering of the network upload message transmission can also be chosen in any suitable or desirable way. For example, a message can be sent by a user of a mobile terminal by appropriately interacting with an application on the mobile terminal, or such a network upload message can also be sent automatically, e.g. in an emergency situation, in which it is desired to alert the surroundings of a potentially dangerous or hazardous situation. In this way, the concept of the present invention can advantageously be applied in the context of a vehicle-mounted system that is arranged to automatically send out a network upload message with a warning or alert content when a suitable detector in the vehicle recognises a dangerous situation, e.g. if an accident detector detects that an accident has occurred or a speed sensor detects an abrupt deceleration and/or the operation of the vehicle hazard warning lights which would indicate a traffic jam.

In step S11 a reflection entity in the cellular communication network receives the network upload message. It is noted that the term "entity" relates to a device or a group of devices for providing the indicated functionality. As such, a node, a node part or a group of nodes can form a network entity.

As indicated above, the network upload message carries a suitable indicator. The reflection entity is arranged for being able to recognise this indicator. This can be done in a variety of ways. For example, the indicator can simply be the address of a service that comprises the reflection entity, such that the network upload messages are forwarded by the network through the reflection entity. In this sense, the server automatically recognises the upload messages. However, it is also possible to e.g. arrange one or more nodes in the cellular communication network to parse messages for the indicator (e.g. a given server address), and to thus recognise and intercept the network upload messages. For example, the reflection entity can be located within a base station, and capable of detecting one or more given server addresses, to then directly perform a reflection operation, i.e. not actually forward the messages towards the indicated address. As can be seen, it is therefore not necessary in this case that a server under said given address actually exists. Equally, the network entity can be arranged to recognise an indicator like a flag in the message header.

In step S12 the reflection entity generates one or more reflection messages comprising the payload part received in the network upload message. For example, the payload part may comprise alert or warning information that the sending terminal wishes to distribute in a specific area around itself. The generation can e.g. comprise that the payload part of the message (which comprises a header with control information and a payload part with content) that is reflected remains untouched, only the header of the message is changed.

The determining which possible terminals should actually receive the reflection message(s) can be done in a variety of ways. For example, the reflection entity can perform or have performed a dedicated determination procedure for establishing the spatial relationship, e.g. by estimating the location of the sending terminal and then applying a specific rule (such as "find all terminals within a radius xy") based on estimated locations of terminals that are possible destinations for the information service.

However, the spatial relationship can also be determined implicitly, e.g. based on the location of the reflection entity itself. Namely, if the reflection entity is associated with a node of the cellular communication network that serves a predetermined area (such as a base station), then the spatial relationship can be established as sending the reflection messages to all terminals within said predetermined area, as it is the predetermined area in which the sending terminal is located. Naturally, the spatial relationship could also be defined as sending the reflection messages to terminals in not only the predetermined area (e.g. cell), but also to neighbouring predetermined areas within an area scheme of the cellular communication network (e.g. neighbouring cells).

It is noted that the localized information service can be provided in such a way that only terminals that register for the service are able to act as service source terminals and/or service destination terminals.

In step S13, the reflection entity sends the one or more reflection messages to the service destination terminals that have a predetermined spatial relationship with the service source terminal.

As steps S10 through S13 are performed, the same or another service source terminal transmits a further network upload message with a payload part in step S20. In case the same service source terminal transmits the network upload message in step S10 and the further network upload message in step S20, the respective network upload messages may have a predetermined context relationship in that they both originate from the same terminal. The reason for the service source terminal repeatedly transmitting a network upload message may lay in the fact that the situation in which the service source terminal finds itself persists, and the terminal accordingly decides for a repeated transmission. However, another situation may well occur, which triggers the same service source terminal to transmit a further network upload message in step S20 that has no predetermined context relationship with the network upload message as sent during step S10.

In a similar way, another service source terminal may transmit the further network upload message in step S20 that may well, however, have a predetermined context relationship with the network upload message as sent in step S10. This could be because the respective other service source terminal finds itself in a related situation as the service source terminal that has sent the network upload message in step S10. Again, the other service source terminal may well transmit a further network upload message that has no predetermined context relationship with the network upload message as sent in step S10, if, for example, the respective other service source terminal detects or finds itself in another situation as the source terminal that has transmitted the network upload message in step S10, although being located nearby to the latter.

In step S21, the reflection entity receives the further service upload message, similarly to receiving the service upload message in step S11.

In a bifurcation S22 it is determined whether the further network upload message has a predetermined context relationship with the network upload message as being sent in step S10. This predetermined context relationship between the two network upload messages may be evaluated in various ways as—for example—described in conjunction with an embodiment of the present invention. Criteria for or the predetermined context relationship as such may further be established in a separate and/or simultaneous step (not shown) by, for example, an aggregator entity.

If it is determined in bifurcation S22 that the further network upload message has the predetermined context relationship with the network upload message as sent in step S10 (case "YES"), the process proceeds to the end from, since any further action may be omitted. This omitting of any further action may manifest the effect of the filter according to the present invention, which avoids sending of additional redundant information and, as a consequence, substantially reduces load to radio and processing resources and renders data reflection in a cellular communication network much more efficient.

If, however, it is determined in bifurcation S22 that the further network upload message has no predetermined context relationship with the network upload message as sent in step S10 (case "NO"), the method proceeds to step S23, in which the reflection entity generates reflection messages with the payload part of the further network upload message sent in step S20.

In step S24 the reflection entity then sends the reflection messages that have been originated from the generating in step S23 to the group of service destination terminals. In this way, the group of service destination terminals is provided with both the reflection messages based on the network upload message sent in step S10 as well as the reflection messages based on the further network upload message sent in step S20. This may particularly the case if the network upload message sent in step S10 and the further network upload message sent in step S20 do not have a predetermined context relationship with each other and, therefore, do not represent redundant information.

In addition to the above, the method embodiment may comprise a further step (not shown) to take note of, establish, and/or define a predetermined context relationship. For example, an emerging context relationship can be identified by analysing received network upload message and determining a context relationship among these messages. In this way, a context relationship can be defined, and for every further received network upload message it could be judged whether or not also this message has the context relationship. Received network upload messages could be aggregated and scanned for common properties or related message content. If, for example, the number of such related messages exceeds a certain threshold value, a respective context relationship can be rendered active.

Figure 2:
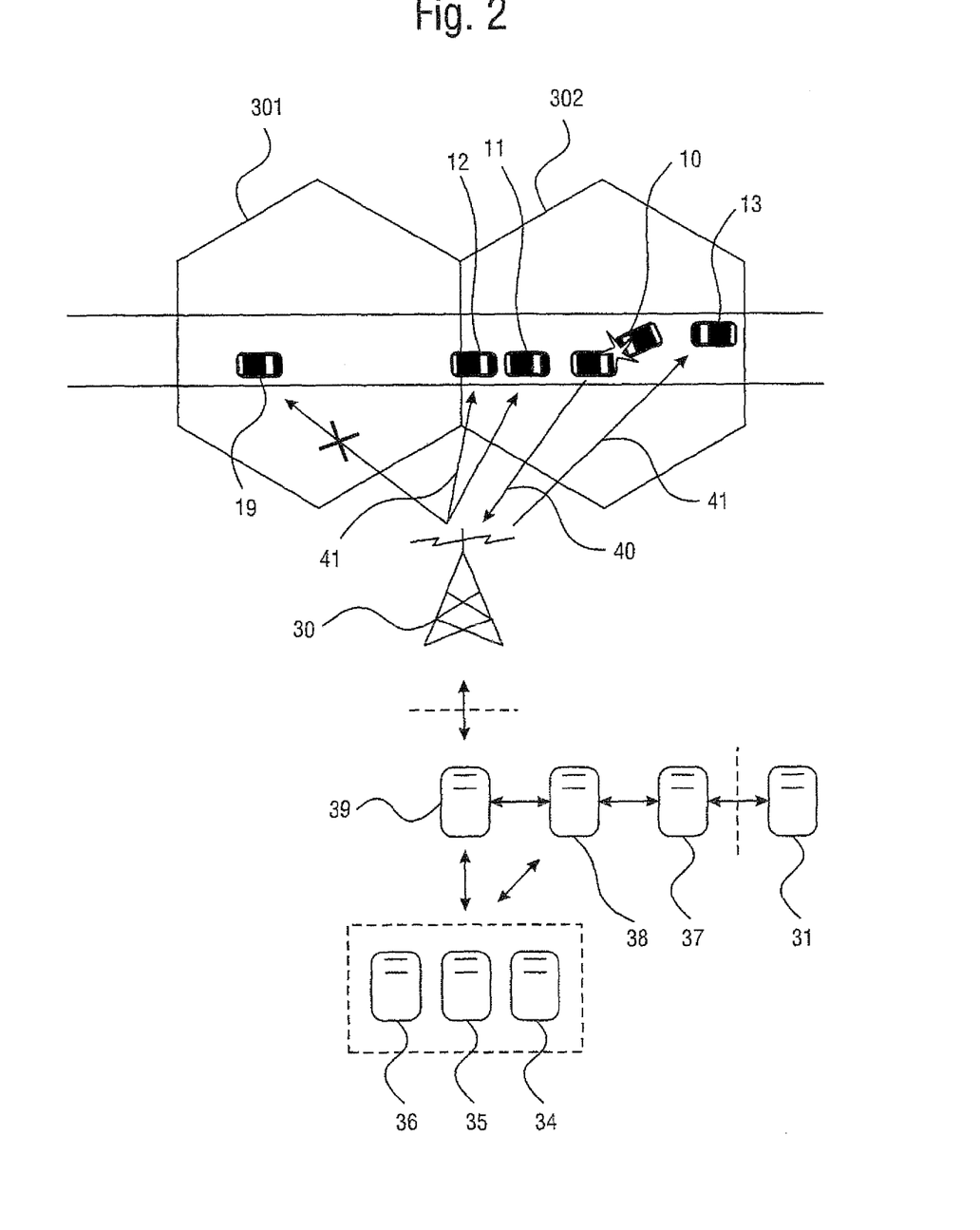
FIG. 2 shows a schematic representation of data reflection in a cellular communication network in which the present invention can be applied.

FIG. 2 shows a schematic representation of data reflection according to an embodiment of the present invention. In this concept, a geographical area is covered by cells 301, 302 of a cellular communication network. This geographical area may comprise a road on which several traffic members travel in different directions. These traffic members may hold service source terminals and/or service destination terminals which can be identified, for the shown example, as a service source terminal 10, and service destination terminals 11, 12, 13, and 19.

The concept of data reflection within a cellular communication network firstly involves transmitting of a network upload message by service source terminal 10 that is involved and/or has become aware of a road traffic hazard, such as an incident or a trail of a traffic jam. Once the service source terminal 10 has detected the occurrence of such a road traffic hazard—or any other event that is due to trigger the sending of a respective network upload message, the service source terminal 10 transmits such a network upload message 40 to the cellular communication network, wherein said upload message 40 comprises some form of a payload part. Said payload part may, for example, indicate the type of reason why the network upload message 40 has been transmitted, such as information on the specific hazard event.

A base station 30 of the cellular communication network, such as a node or a so-called "eNodeB" or "NodeB", receives the network upload message 40 and forwards this message to a reflection entity 31. This reflection entity 31 is arranged for receiving the network upload message 40 and for generating one or more reflection messages 41 comprising said payload part. Further, the reflection entity 31 is arranged for sending said one or more reflection messages 41 to at least one service destination terminal that has a spatial relationship with the service source terminal 10, such as the service destination terminal 11.

By way of example, FIG. 2 depicts a situation in which the spatial relationship is defined by means of the cell 302 of the cellular communication network. In this way, only the service destination terminals 11, 12, and 13 receive the reflection message 41, whereas the service destination terminal 19, that is outside the cell 302 does not receive said reflection message.

Further, the definition of the spatial relationship by means of the cells of the cellular communication network may be induced by the fact that the respective cells 301, 302 are sufficiently large, such that any service destination terminal that is located outside a respective cell, such as the cell 302, is not immediately affected by the respective event from which the network upload message originates. If the cells 301, 302 are sufficiently large, it may suffice that service destination terminal 19 only receives the reflection message 41 upon reaching or entering the cell 302 from cell 301, hence, reaching the same spatial relationship with the service source channel 10. The spatial relationship may, in general, also consider the case that two respective terminals are on a co-called collision course, indicating that the spatial relationship may be characterized in that a service destination terminal is moving toward the service source terminal, implying that events that have affected the source terminal will also soon affect the respective destination terminal.

It is noted, however, that the spatial relationship needs not to be defined in conjunction with cells or other spatial units of the cellular communication network, and can also be entirely independent from any spatial units of the network. For example, all involved terminals may provide positional information, obtained, for example, from satellite or earth bound positioning signals, to the network entity 31, which, as a consequence, may be able to independently and autonomously calculate whether two terminals qualify for the predetermined spatial relationship.

The forwarding of the messages, i.e. the network upload messages 40 and/or the reflection messages 41 from the base station 30 to the reflection entity 31, may include forwarding of the respective messages between a Radio Network Controller 39, a Serving GPRS Support Node 38, a Gateway GPRS Support Node 37, a BM-SC 36, a Cell Broadcast Centre 35, and/or a Mobile Positioning System 34.

Figure 3A:
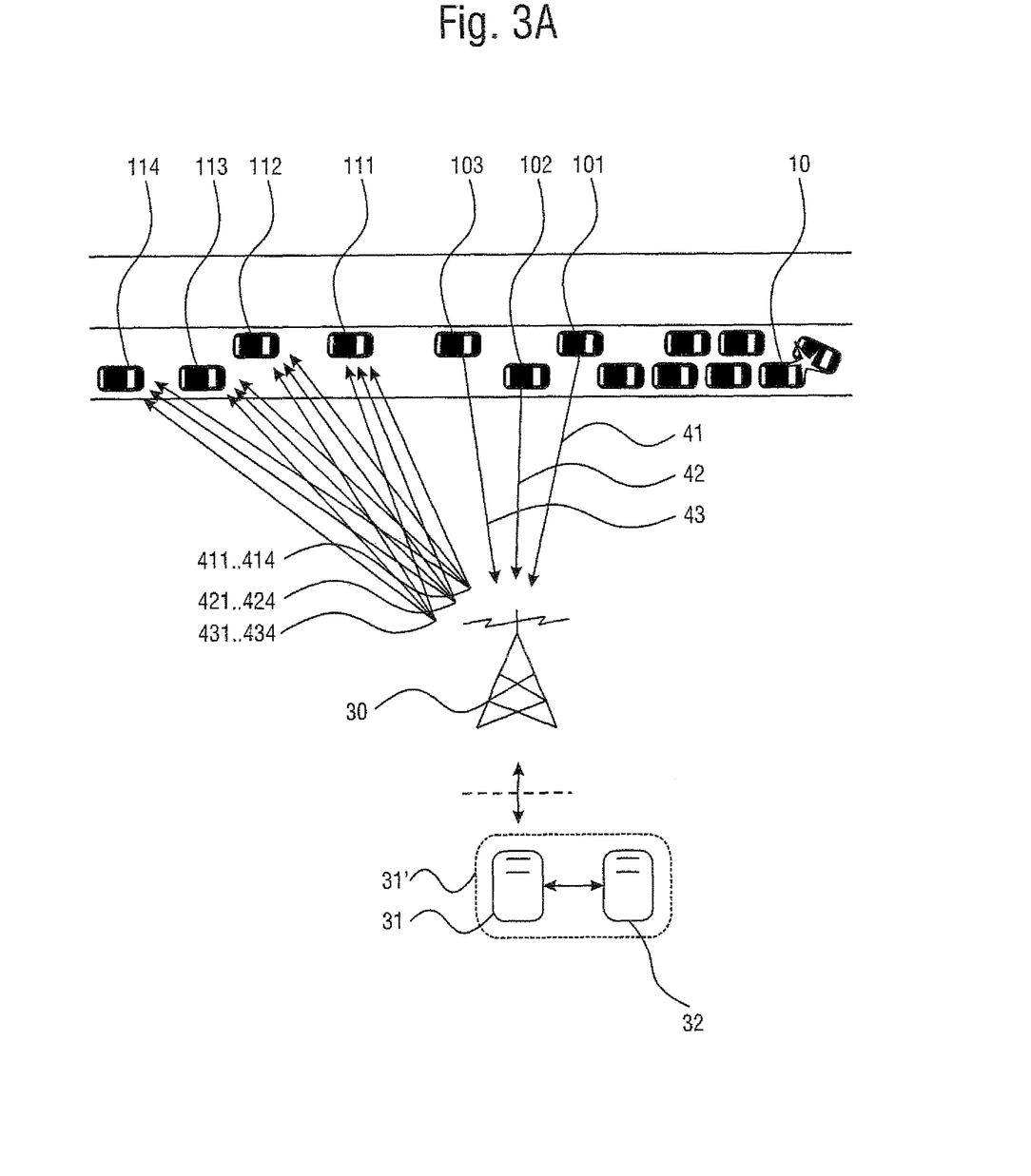
FIGS. 3A and 3B show schematic representations of scenarios of data reflection according to an embodiment of the present invention.

FIG. 3A shows a first scenario in a cellular communication network according to an embodiment of the present invention. FIG. 3A shows some kind of road hazard, which, for example, is caused by a collision accident of traffic member 10. This collision accident may result in a road block that, in turn, may cause a traffic jam of succeeding traffic members 101 to 114. Once first traffic members 101 to 103 get closer to the road hazard event they will usually become involved in the respective traffic jam and detect the respective situation by, for example, a suddenly decreased travelling speed in conjunction with a short operation of the hazard warning lights by the driver.

Having detected a road hazard may turn traffic members 101 to 103 into respective service source terminals 101 to 103 that all transmit a respective network upload message 41, 42, and 43 to a base station 30 of the cellular communication network. These network upload messages 41 to 43 are received by the reflection entity 31 via the base station 30, the former reflection entity 31 now generating reflection messages for each service destination terminal that has a predetermined spatial relationship with the originating service source terminals 101 to 103. By means of example, all depicted traffic members and service terminals are assumed to have such a spatial relationship with one another.

In this way, the reflection entity 31 generates and sends a plurality of reflection messages based on each received network upload message 41 to 43, namely, in the present exemplary case, in total at least 12 messages 411 to 414, 421 to 424, and 431 to 434 to the respective service destination terminals 111, 112, 113, and 114. It is noted that the reflection entity 31 may also send further reflection messages to the service source terminals 101, 102, 103, such as, for example, a reflection message based on the network upload message 41 to the service source terminal 102 which may act at this instance also as a service destination terminal that has a spatial relationship with service source terminal 101. For the sake of clarity, however, these additional messages are omitted in FIG. 3A.

As becomes apparent from the scenario of FIG. 3A, all involved service source terminals 101, 102, and 103 do transmit respective network upload messages 41, 42, 43, which are all related to each other. All source terminals are due to warn service destination terminals that have a predetermined spatial relationship with the respective service source terminal about the same event, namely the traffic jam caused by the collision accident of traffic member 10. At this point, however, an aggregator entity 32 may be able to effectively avoid further transmission and distribution of redundant information. The aggregator entity 32 may be an entity implemented such as the reflection entity 31, may be part of the reflection entity 31 itself, or may form part—in conjunction with the reflection entity 31—of an integrated reflection entity 31'.

Further, the reflection entity 31 may forward each received network upload message to the aggregator entity 32 for establishing a predetermined context relationship, for determining whether a further network upload message has such a context relationship, and/or for generating a common, consolidated reflection message. The aggregator entity 32 may also provide reflection context information to the reflection entity 31, which may be based or comprise above-described criteria for determining whether or not any given network upload messages has a respective context relationship with another message. The reflection entity 31 can then decide whether or not a further network upload message is to be blocked from reflection. The reflection context may further be attached to the common reflection message as generated by the aggregator entity 32. Moreover, by leaving computation intensive tasks, such as the generation of the reflection context information and the common reflection message or establishing the predetermined context relationship in general, to the aggregator 32, scalability of the concept with a given cellular communications network can be eased and guaranteed.

The scenario as depicted in FIG. 3A may show a scenario in which the reflection entity 31 diagnoses a predetermined context relationship amongst network upload messages 41 to 43, but still decides not to block these messages from message reflection. The scenario may, however, also represent the situation in which the aggregator entity 32 (or the reflection entity 31 as such) is about to establish a predetermined context relationship. In other words, one of the entities 31, 32 may become aware of a sudden accumulation of received network upload messages (e.g. messages 41, 42, and 43) that all originate from nearby locations within short time intervals among each other. As a consequence, one of the entities 31, 32 may now establish the context relationship in that respective messages have to originate from the vicinity of the service source terminals 101, 102, and 103. This predetermined context relationship may be equipped with a lifetime, such that it becomes invalid after expiry of a given time span.

Figure 3B:
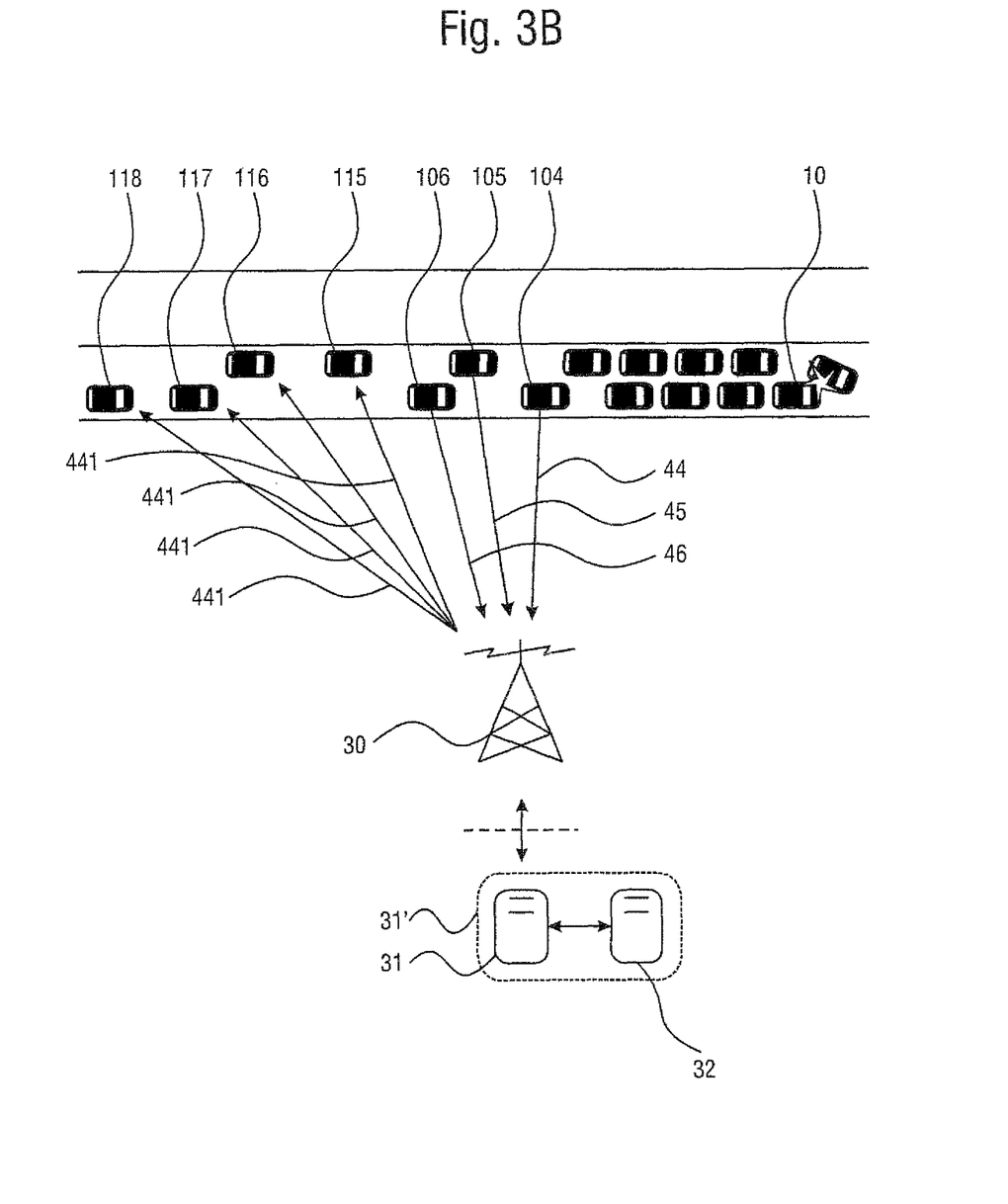

FIG. 3B depicts the situation in which a predetermined context relationship has been established and filtering of received network upload messages is effective. As further traffic members 104 to 106 approach the traffic jam, they may also turn into respective service source terminals 104 to 106 that transmit network upload messages 44 to 46.

However, filtering is effective and network upload messages 44 to 46 are blocked from being sent to service destination terminals that have a spatial relationship with one of the service source terminals 104 to 105, thus, drastically reducing load to radio and processing resources. Instead, the reflection entity 31 may send only one reflection message 434 to all service destination terminals 115 to 118 that reach the predetermined spatial relationship with one of the service source terminals 104 to 106. Said single reflection message 434 may be based on one of the hitherto received network upload messages 41 to 46, or may also be a so-called common reflection message that is generated by the reflection entity 31 or the aggregator entity 32. Further, only a fraction of received network upload messages that have the predetermined context relationship can be blocked, such that some messages, for example every n-th incoming message, is nevertheless reflected. In this way, repeated warning on a persistent hazard event is achieved wherein the warning also reaches a maximum number of affected service destination terminals.

Such a common message may be generalized or modified such to be more suitable for being forwarded to a plurality of service destination terminals with respect to a reflection message that is based on a sole network upload message. For example, the initial network upload message may only comprise a warning such as "REDUCE SPEED", whereas the reflection entity 31 or the aggregator entity 32 may draw the conclusion from a plurality of such messages within a short period that a traffic jam has developed and, thus, generates a common reflection message that may comprise a warning "TRAFFIC JAM". Further, this common reflection message may be changed over time, such that, for example, the common reflection message takes into account the number of hitherto received network upload messages that have the predetermines context relationship with one another, and, therefore, provides an information on length and extension of the respective traffic jam.

In this way, all additionally arriving traffic members 115 to 118 are equally warned of the traffic jam while substantially reducing load to radio and processing resources of the cellular communication network, since the reflection entity 31 applies the context relationship for avoiding sending of redundant information.

Figure 4A:
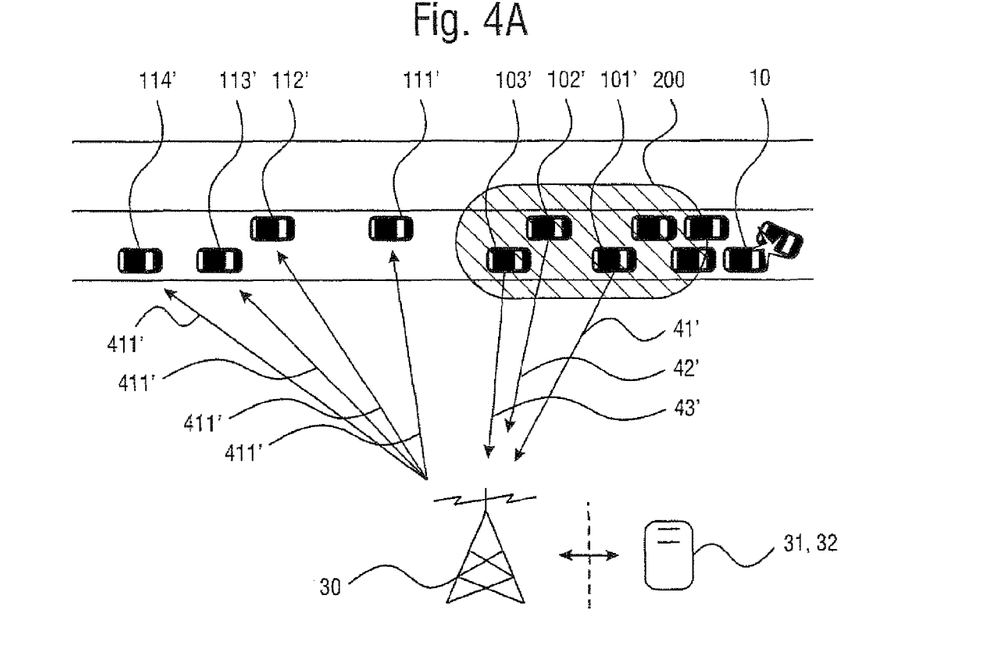
FIGS. 4A and 4B show schematic representations of further scenarios including a context zone, according to a further embodiment of the present invention.

FIG. 4A shows a further scenario in a cellular communication network according to another embodiment of the present invention. Accordingly, a context zone 200 is defined by the reflection entity 31 and/or the aggregator entity 32 that specifies a spatial zone from which all received network upload messages 41', 42', 43' from respective service source terminals 101', 102', and 103' inside the context zone 200 are assumed to have the predetermined context relationship. The zone 200 can also be established and defined by the aggregator entity 32 in a similar way as such an entity may establish the context relationship itself or related criteria. In general, the context zone 200 can be defined by a data structure defining any arbitrarily shape area, such as a road link segment, e.g. represented by two WGS84 coordinates, or, in a simple case, just in form of a cell-ID of the respective cell or sub-cell of the cellular communications network.

In this way, the reflection entity 31 may send only one reflection message 411', which can be again a common reflection message, to all newly arriving traffic members 111' to 114' that have now a spatial relationship with one of the service source terminals 101' to 103' and/or are inside the context zone 200.

In this way, the reflection entity 31 only sends one reflection message 411' instead of generating and sending further reflection messages based on the further network upload messages 42' and 43', hence, substantially reducing load to radio and processing resources and rendering data reflection substantially more efficient. As a consequence, although the respective localized information service of data reflection is also operable outside of and independent from the context 200, quality of service inside the zone may be enhanced, since redundant distribution of information is avoided. Further, service destination terminals can be quickly provided with respective reflection messages as soon as they enter the spatial relationship and/or the context zone 200, which is independent from transmitting a respective network upload message.

Figure 4B:
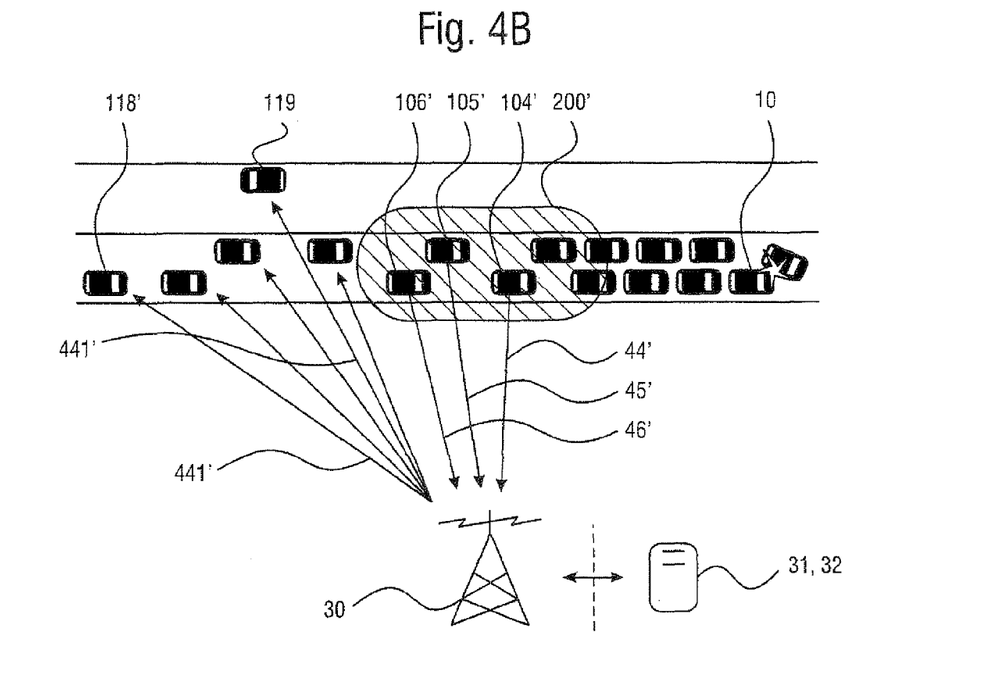

As shown in FIG. 4B, the context zone may also be changed in time such to form an evolved context zone 200'. Such changes may be applied to adapt the position and/or spatial extension to the respective event, such as the trail of a traffic jam. As shown in the example of FIG. 4B, the road block caused by the collision accident of traffic member 10 causes a traffic jam, the end of which is constantly moving away upstream from the location of traffic member 10 as more and more traffic members arrive. As a consequence, the context zone may be translated or resized in form of the evolved context zone 200' in order to account for another area from which originating network upload messages should be assumed to have a predetermined context relationship.

As a consequence, the system is able to take into account change of a context zone as in the shown example of the newly arriving further traffic members 104' to 106' that are—although being farther and farther away from the location of the cause of the collision accident of traffic member 10—still triggering the sending of network upload messages that are related to the same event. In this way, since the context zone 200' has been updated, for example by means of updating of the respective reflection context information, in location and/or spatial extension, the network entity 31 and/or the aggregator entity 32 may now also determine that the network upload messages 44' to 46' have the predetermined context relationship, and may, hence, avoid sending or generating of redundant information.

In this way, the reflection entity 31 only sends the reflection message 441' to the newly arriving traffic members, such as the traffic member 118' and a traffic member 119 that travels in the opposite direction. Further, a re-sending of a reflection message to all involved service destination terminals may be triggered by updating the reflection context information and/or the context zone 200, 200'. It is noted that such updates to reflection context information and/or to the context zone usually occur much less frequently than respective network upload messages are transmitted by the plurality of affected service source terminals.

In general, if a lifetime of the context zones 200, 200' expires, or when it is detected that underlying hazard event has resolved, data reflection may return to an unfiltered mode, in which received network upload messages are reflected without blocking. Such a situation may be identified in case a number of received network upload messages per unit time falls below a predetermined threshold, or in case no network upload message is received for a given time interval. Further, the lifetime can be put into consideration of updating the context zone, such that, for example, the context zone expires if no update has occurred thereto within its respective lifetime.

Embodiments of the invention can improve the efficiency of localized information services in a cellular communication network (avoids transmission and distribution of redundant information) and enable thereby novel applications, like effective and fast road traffic hazard warnings, i.e. vehicles are able to warn vehicles in the proximity on accidents, critical driving situations, slippery road conditions, etc.

Although detailed embodiments have been described, these only serve to provide a better understanding of the invention defined by the appended claims, and are not to be seen as limiting.

The invention claimed is:

1. A system for providing a localized information service using an infrastructure of a cellular communication network, the system comprising:
    at least one service source terminal arranged for transmitting a network upload message to the cellular communication network, said network upload message comprising a payload part;
    a reflection entity of said cellular communication network arranged for receiving said network upload message, for generating one or more reflection messages comprising said payload part, and for sending said reflection messages to a group of service destination terminals that have a predetermined spatial relationship with said service source terminal; and
    a filter arranged for blocking a further network upload message that has a predetermined context relationship with said network upload message from being sent to the group of service destination terminals;
    wherein an arbitrarily shaped area as a context zone is defined and wherein the network upload messages from service source terminals inside the context zone are assumed to have the predetermined context relationship.

2. The system of claim 1, wherein the filter is arranged for generating a common reflection message based on at least one of the network upload message and the further network upload message.

3. The system of claim 2, wherein the reflection entity is arranged for sending said common reflection message to the group of service destination terminals.

4. The system of claim 3, wherein the reflection entity is arranged for repeatedly sending said common reflection message.

5. The system of claim 1, wherein the filter is implemented in the reflection entity.

6. The system of claim 1, wherein the filter is implemented in an aggregation entity arranged for receiving the network upload messages from the reflection entity.

7. The system of claim 1, wherein the context relationship is determined on the basis of at least one of a spatial coincidence and a temporal coincidence of at least the network upload message and the further network upload message.

8. The system of claim 1, wherein the context relationship comprises a lifetime determining whether the filter blocks the further network upload message.

9. The system of claim 1, wherein the context relationship is updated.

10. The system of claim 1, wherein the context zone is adapted over time.

11. The system of claim 1, wherein the service source terminal detects automatically a hazard event and transmits the network upload message upon sensing said hazard event.

12. The system of claim 1, wherein the at least one service source terminal is vehicle mounted.

13. The system of claim 1, wherein said reflection entity is associated with a node of said cellular communication network that serves a predetermined area.

14. The system of claim 13, wherein said reflection entity is located at a base station of said cellular communication network.

15. The system of claim 1, wherein said reflection entity performs a message anonymization procedure for omitting information identifying said service source terminal from said one or more reflection messages.

16. A method for operating a system that provides a localized information service using an infrastructure of a cellular communication network, the system includes: at least one service source terminal arranged for transmitting a network upload message to the cellular communication network, said network upload message comprising a payload part; and a reflection entity of said cellular communication network arranged for receiving said network upload message, for generating one or more reflection messages comprising said payload part, and for sending said reflection messages to a group of service destination terminals that have a predetermined spatial relationship with said service source terminal, the method comprising:
filtering the network upload messages for blocking a further network upload message that has a predetermined context relationship to said network upload message from being sent to the group of service destination terminals; and
defining an arbitrarily shaped area as a context zone;
wherein said network upload messages from said service source terminals inside the context zone are assumed to have the predetermined context relationship.

17. A network entity of a cellular communication network, comprising:
a receiver for receiving from at least one service source terminal a network upload message comprising a payload part;
a message generator for generating one or more reflection messages comprising said payload part;
a message sender for sending said one or more reflection messages to a group of service destination terminals that have a predetermined spatial relationship with said service source terminal; and
a filter for blocking a further network upload message that has a predetermined context relationship to said network upload message from being sent to the group of service destination terminals;
wherein an arbitrarily shaped area as a context zone is defined, and wherein said network upload messages from said service source terminals inside the context zone are assumed to have the predetermined context relationship.

18. A method of controlling a network entity, said method comprising:
receiving from at least one service source terminal a network upload message comprising a payload part;
generating one or more reflection messages comprising said payload part;
sending one or more reflection messages to a group of service destination terminals that have a predetermined spatial relationship with said service source terminal;
blocking a further network upload message that has a predetermined context relationship to said network upload message from being sent to the group of service destination terminals; and
defining an arbitrarily shaped area as a context zone, wherein the network upload messages from the service source terminals inside the context zone are assumed to have the predetermined context relationship.

19. A non-transitory computer-readable storage medium that stores computer-executable process steps, said computer-executable process steps causing a reflection entity of a communication network to perform the steps of:
receiving from at least one service source terminal a network upload message comprising a payload part;
generating one or more reflection messages comprising said payload part;
sending one or more reflection messages to a group of service destination terminals that have a predetermined spatial relationship with said service source terminal;
blocking a further network upload message that has a predetermined context relationship to said network upload message from being sent to the group of service destination terminals; and
defining an arbitrarily shaped area as a context zone, wherein the network upload messages from the service source terminals inside the context zone are assumed to have the predetermined context relationship.

* * * * *